US009018794B2

(12) United States Patent
Okabe et al.

(10) Patent No.: US 9,018,794 B2
(45) Date of Patent: Apr. 28, 2015

(54) ELECTRIC POWER CONTROLLER FOR VEHICLE WITH STOP START SYSTEM

(75) Inventors: Takeru Okabe, Tokyo (JP); Masaki Horii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1208 days.

(21) Appl. No.: 12/913,392

(22) Filed: Oct. 27, 2010

(65) Prior Publication Data

US 2011/0266865 A1 Nov. 3, 2011

(30) Foreign Application Priority Data

Apr. 28, 2010 (JP) ................................ 2010-103567

(51) Int. Cl.
| | |
|---|---|
| *B60W 30/18* | (2012.01) |
| *B60W 10/06* | (2006.01) |
| *B60W 10/26* | (2006.01) |
| *B60W 10/30* | (2006.01) |
| *B60W 50/02* | (2012.01) |
| *F02N 11/04* | (2006.01) |
| *F02N 11/08* | (2006.01) |
| *B60K 6/28* | (2007.10) |

(52) U.S. Cl.
CPC ......... *B60W 30/18018* (2013.01); *B60W 10/06* (2013.01); *B60W 10/26* (2013.01); *B60W 10/30* (2013.01); *B60W 50/0205* (2013.01); *B60W 2510/0638* (2013.01); *B60W 2510/244* (2013.01); *F02N 11/04* (2013.01); *F02N 11/0866* (2013.01); *B60K 6/28* (2013.01); *B60Y 2400/114* (2013.01); *Y02T 10/6278* (2013.01)

(58) Field of Classification Search
CPC .................................................. B60W 30/18018
USPC ........................................................ 307/10.6
See application file for complete search history.

(56) References Cited

U.S. PATENT DOCUMENTS

| | | | | |
|---|---|---|---|---|
| 5,710,699 | A | * | 1/1998 | King et al. ..................... 363/132 |
| 6,982,499 | B1 | * | 1/2006 | Kachi et al. ..................... 307/75 |
| 7,513,323 | B2 | * | 4/2009 | Gronbach ..................... 180/65.1 |
| 7,791,216 | B2 | * | 9/2010 | Xu et al. ........................ 307/9.1 |
| 7,872,362 | B2 | * | 1/2011 | Kato et al. .................. 290/40 C |
| 2002/0158513 | A1 | * | 10/2002 | Amano et al. ............... 307/10.6 |

(Continued)

FOREIGN PATENT DOCUMENTS

| | | |
|---|---|---|
| DE | 10 2008 000 904 A1 | 10/2009 |
| JP | 5-160916 A | 6/1993 |

(Continued)

OTHER PUBLICATIONS

German Office Action dated Jul. 24, 2013, issued in corresponding Patent Application No. 10 2010 049 911.0.

(Continued)

*Primary Examiner* — Daniel Cavallari
(74) *Attorney, Agent, or Firm* — Sughrue Mion, PLLC; Richard C. Turner

(57) ABSTRACT

An electric power controller for a vehicle with stop-start system is provided to prevent electric energy from being decreased in a power capacitor when an engine is in an idle-stop state. The engine is in the idle-stop state by idle-stop control means, the transfer of the electric energy between the power capacitor and a vehicle-mounted battery is stopped by power control means connected between the power capacitor and the vehicle-mounted battery.

4 Claims, 9 Drawing Sheets

(56) References Cited

U.S. PATENT DOCUMENTS

| | | | |
|---|---|---|---|
| 2010/0024756 A1* | 2/2010 | Seufert et al. | 123/179.3 |
| 2011/0264315 A1 | 10/2011 | Blind et al. | |
| 2012/0245779 A1* | 9/2012 | Goto et al. | 701/22 |

FOREIGN PATENT DOCUMENTS

| | | |
|---|---|---|
| JP | 7-23504 A | 1/1995 |
| JP | 8-196006 A | 7/1996 |
| JP | 2003-70103 A | 3/2003 |
| JP | 2004-84515 A | 3/2004 |
| JP | 2004-108226 A | 4/2004 |
| JP | 2004-183570 A | 7/2004 |
| JP | 2006-112386 A | 4/2006 |

OTHER PUBLICATIONS

Japanese Office Action dated Mar. 6, 2012, issued in corresponding Japanese Patent Application No. 2010-103567.

* cited by examiner

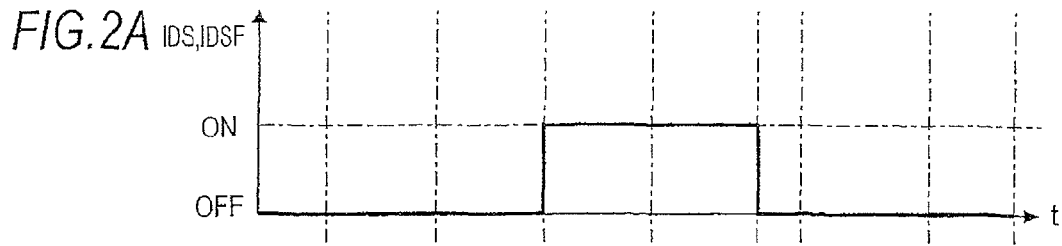
FIG.2A IDS,IDSF
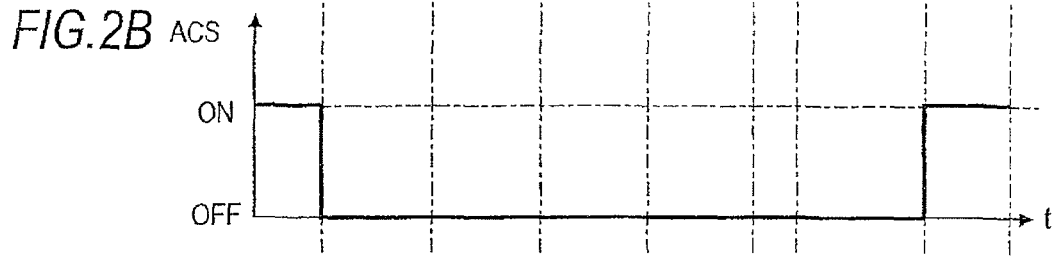
FIG.2B ACS
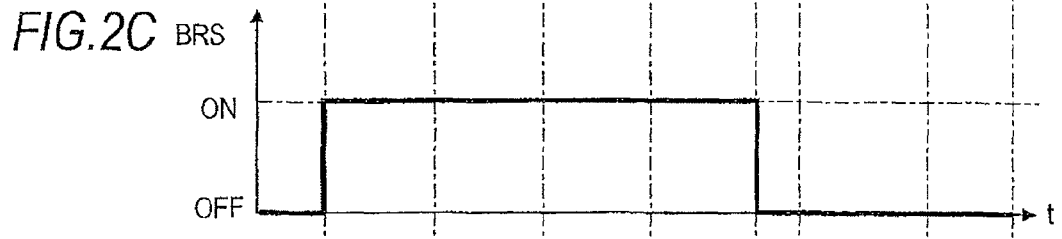
FIG.2C BRS
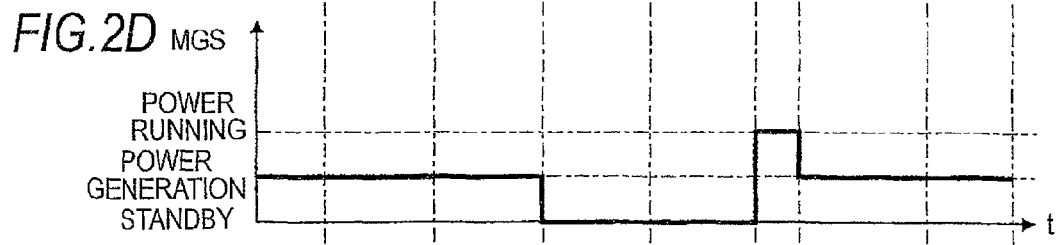
FIG.2D MGS
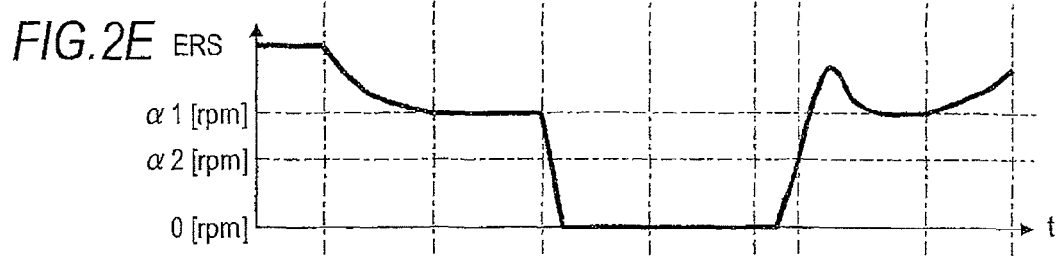
FIG.2E ERS
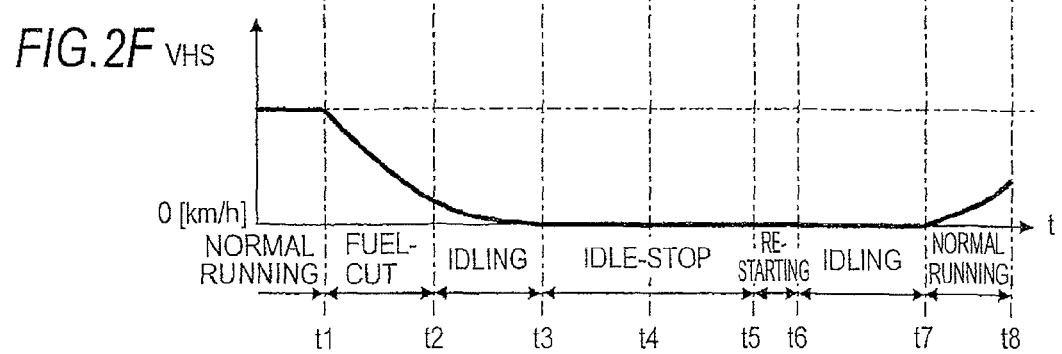
FIG.2F VHS

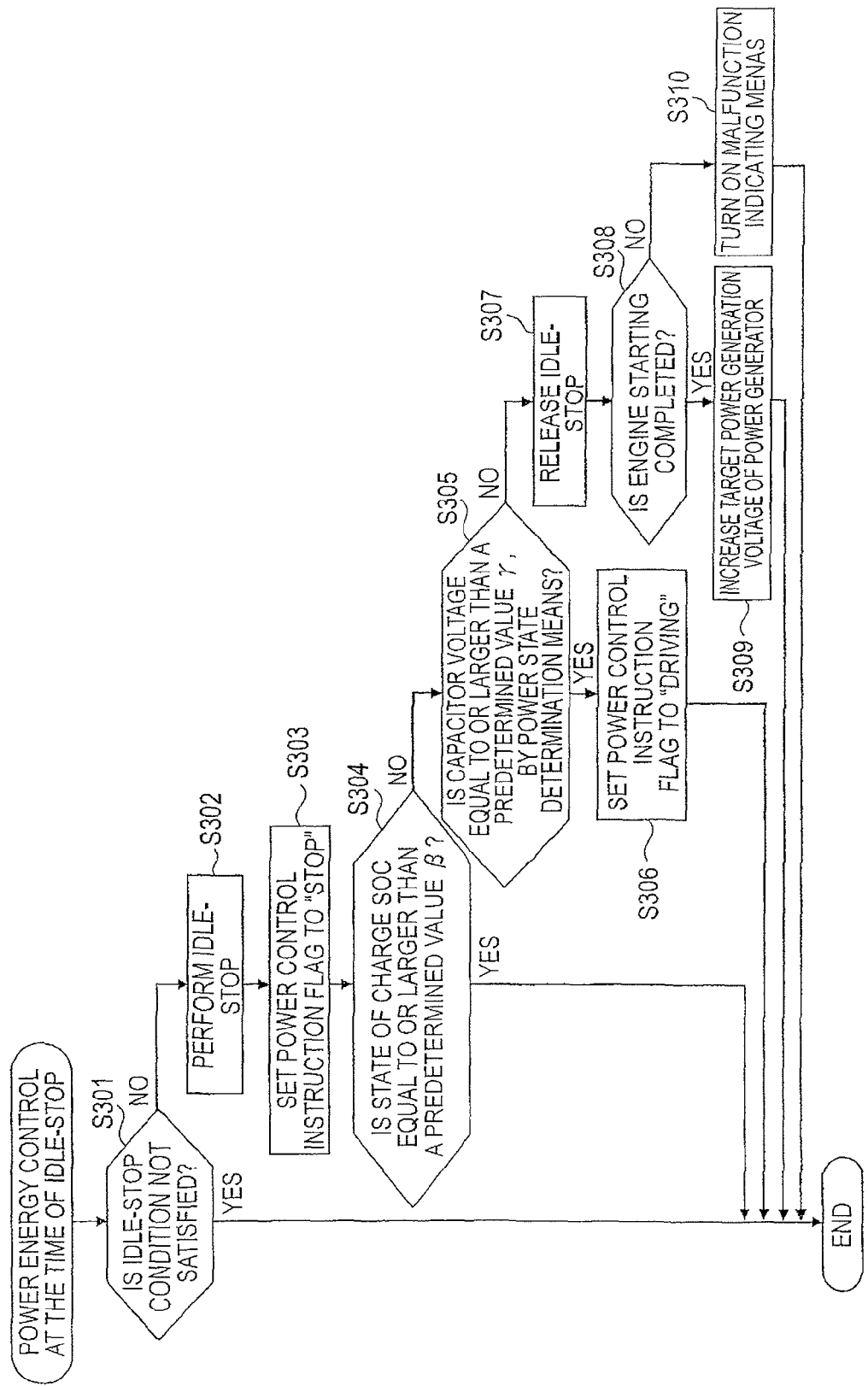

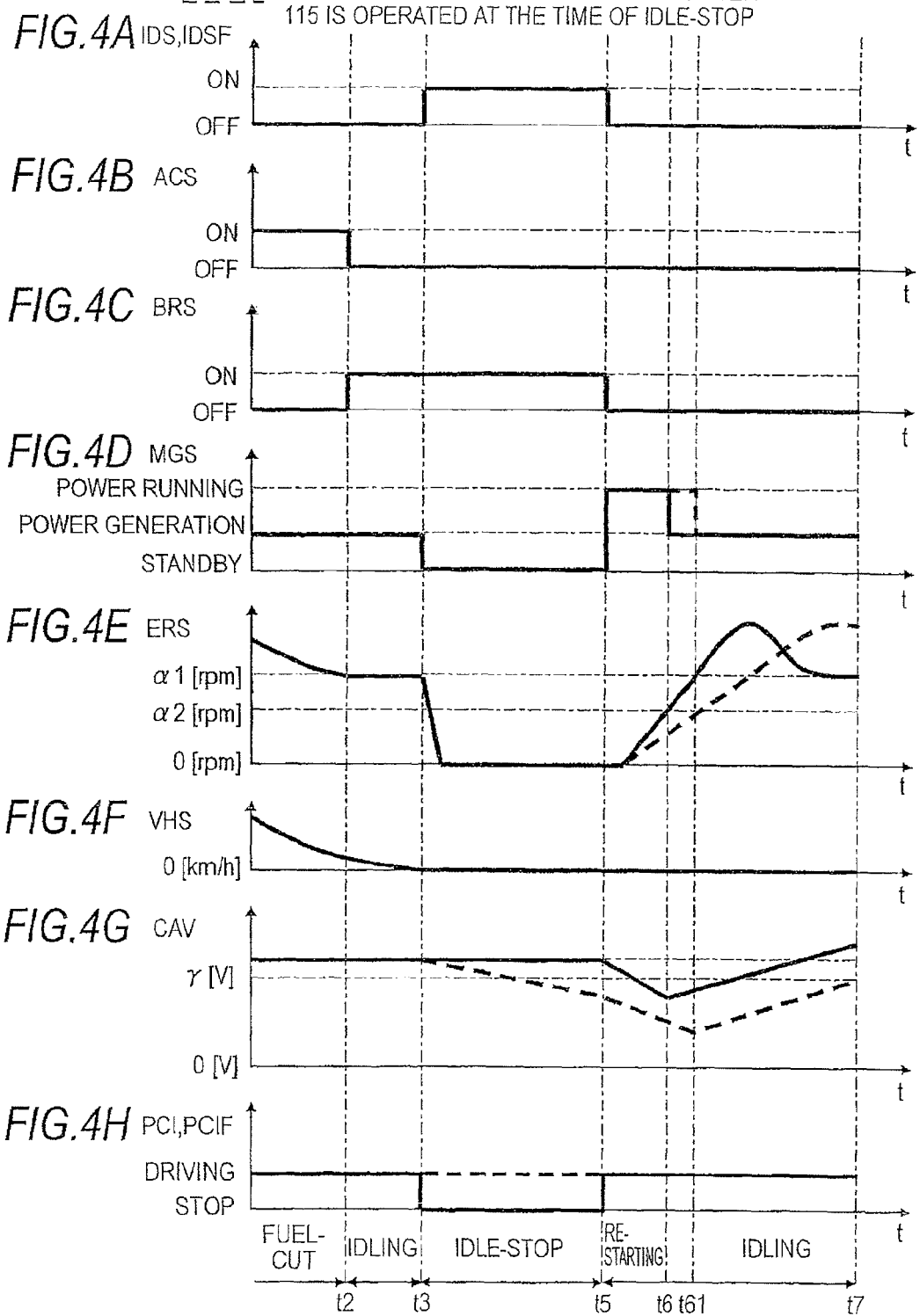

ELECTRIC POWER CONTROLLER FOR VEHICLE WITH STOP START SYSTEM

BACKGROUND OF THE INVENTION

1. Field of the Invention

The present invention relates to an electric power controller for a vehicle with stop-start system.

2. Description of the Background Art

In JP8-196006A, there is disclosed a retarder device for use in a general vehicle, while an electric power controller for a vehicle with stop-start system is not disclosed therein. In such the retarder device, a motor/generator is connected to an engine output shaft. A power capacitor for charging and discharging electric power and a vehicle-mounted battery for supplying electric power to an electric load are connected to the motor/generator. A DC/DC converter is connected between the power capacitor and the vehicle-mounted battery. The motor/generator is used as a generator when an engine is braked, and converts a mechanical energy of the engine into an electric energy and charges the power capacitor with the electric energy. Further, the motor/generator is operated as a motor when the engine is started, and directly drives a crank shaft of the engine using the electric energy charged in the power capacitor. The motor/generator is required to generate a high level of torque for directly driving the engine when the engine is started. In the power capacitor disclosed in JP8-196006A, a capacitor having a high voltage of 200V or more is used to meet this requirement.

In the retarder device in JP8-196006A, the DC/DC converter is driven when the engine is stopped to transfer electric power to the vehicle-mounted battery from the power capacitor. The power capacitor has a self-discharging characteristic in the state of being condensed. Accordingly, in order to prevent loss of the electric power energy due to the self-discharging, when the engine is stopped, the electric energy accumulated in the power capacitor is transferred to the vehicle-mounted battery by means of the DC/DC converter. When the engine is stopped, the electric power returns to the power capacitor from the vehicle-mounted battery by means of the DC/DC converter, and when the engine is started, the electric power is fed to the motor/generator from the power capacitor.

As described above, since the retarder device in the related art is configured so that the electric power of the power capacitor is transferred to the vehicle-mounted battery through the DC/DC converter at the time of the engine stop so as to suppress the self-discharging generated when the power capacitor is left unmanaged for a long time, and the electric power transferred to the vehicle-mounted battery is returned to the power capacitor when the engine is started, there is a problem in that the electric energy is decreased before and after the engine stop in consideration of the conversion efficiency of the DC/DC converter. For example, if the conversion efficiency of the DC/DC converter is set to 90%, the total electric energy after the engine starting is decreased to 81% of the electric energy before the engine stop.

Further, even if the retarder device in the related art is modified so that the electric power transferred to the vehicle-mounted battery is not returned to the power capacitor when the engine is started, there is a problem that electric voltage of the power capacitor is decreased in order to transfer the electric energy to the vehicle-mounted battery from the power capacitor when the engine is stopped.

SUMMARY OF THE INVENTION

The present invention has been made to solve the above problems in the related art, in an electric power controller for a vehicle with stop-start system in which an engine is controlled to an idle-stop state according to an operation condition of a vehicle and to a re-starting state after the idle-stop state, and to provide an electric power controller for the vehicle with the stop-start system which is capable of suppressing loss of electric energy before and after the idle-stop state, preventing electric voltage of the power capacitor from being decreased in the idle-stop state, and suppressing a re-starting performance of the engine from being deteriorated after the idle-stop state.

According to an aspect of the present invention, there is provided an electric power controller for a vehicle with stop-start system of in which an engine is controlled to an idle-stop state according to an operation condition of the vehicle and to a re-starting state after the idle-stop state, the electric power controller including: a motor/generator which drives the engine at the re-starting state of the engine and is driven by the engine at a self-running state after the engine has been re-started to generate electric energy; a power capacitor which is charged with the electric energy generated by the motor/generator and supplies the electric energy to the motor/generator at the re-starting state of the engine; power control means which is connected between a vehicle-mounted battery for supplying electric power to an electric load and the power capacitor, for performing control so that the vehicle-mounted battery is charged with the electric energy accumulated in the power capacitor; and idle-stop control means for controlling the engine to the idle-stop state, wherein the power control means performs control so that the transfer of the electric energy between the power capacitor and the vehicle-mounted battery is stopped in the idle-stop state.

In the electric power controller for the vehicle with stop-start system according to the present invention, since the transfer of the electric energy between the power capacitor and the vehicle-mounted battery is stopped by the power control means in the idle-stop state, the electric energy transferred to the vehicle-mounted battery from the power capacitor is suppressed, and thus, the electric energy in the power capacitor can be maintained. Thus, it is possible to stably supply the electric power to the motor/generator, and to prevent the re-starting performance of the engine from being deteriorated even after the idle-stop state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2F are timing charts illustrating the behaviors of a variety of elements of the vehicle with respect to an idle-stop control operation according to a temporary stop of the vehicle according to the first embodiment.

FIG. 3 is a flowchart illustrating an electric power control operation before and after an idle-stop state according to the first embodiment.

FIGS. 4A to 4H are timing charts illustrating the behaviors of a variety of elements of the vehicle with respect to a first electric power control operation before and after the idle-stop state according to the first embodiment.

DETAILED DESCRIPTION OF THE INVENTION

Hereinafter, several embodiments of an electric power controller for a vehicle with stop-start system according to the present invention will be described with reference to the accompanying drawings. In the following description of each embodiment of the present invention, the "vehicle" represents a vehicle with stop-start system.

First Embodiment

Figure 1:
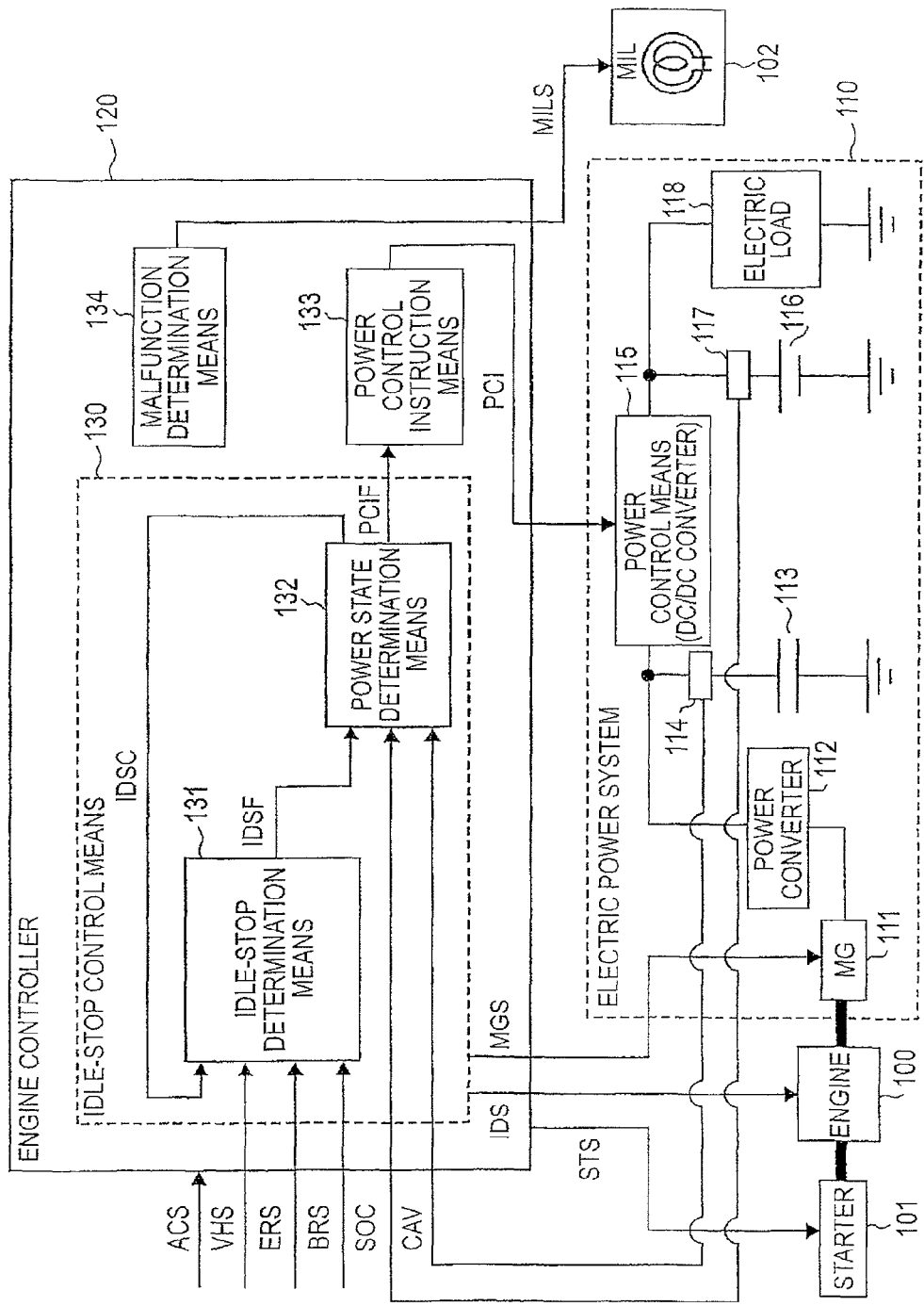
FIG. 1 is a block diagram illustrating an entire configuration of an electric power controller for a vehicle with stop-start system according to a first embodiment of the present invention.

FIG. 1 is a block diagram illustrating an overall configuration of an electric power controller for a vehicle with stop-start system according to a first embodiment of the invention.

(1) Description of the Overall Configuration of the First Embodiment

Firstly, the overall configuration of the first embodiment will be described with reference to FIG. 1.

The electric power controller for the vehicle with stop-start system according to the first embodiment includes an engine 100, a starter 101, a malfunction indicating means 102, an electric power system 110, and an engine controller 120. The vehicle with stop-start system is automatically controlled to an idle-stop state according to an operating condition of the vehicle. Specifically, when the vehicle is in a temporary stop state, the vehicle is automatically controlled to the idle-stop state. The temporary stop of the vehicle may include, for example, a temporary stop during running of the vehicle, and may include a temporary stop of the vehicle at stoplights by way of example. However, the temporary stop of the vehicle is not limited thereto, and may include a temporary stop due to a traffic jam or the like.

The electric power system 110 includes a motor/generator 111, a power converter 112, a power capacitor 113, a capacitor sensor 114, a power control means 115, a vehicle-mounted battery 116, a battery sensor 117, and an electric load 118. The engine controller 120 controls a variety of controls of the engine 100, and performs a start-up control, an ignition control, a fuel supply control and the like of the engine 100. The engine controller 120 is made, for example, by using a microcomputer. According to the present invention, the engine controller 120 includes an idle-stop control means 130, a power control instruction means 133, and a malfunction determination means 134. The idle-stop control means 130 includes an idle-stop determination means 131, and a power state determination means 132.

According to the present invention, the engine controller 120 performs an idle-stop control with respect to the engine 100 and an electric power control with respect to the electric power system 110. The engine controller 120 outputs a starter signal STS with respect to the starter 101, an idle-stop signal IDS with respect to the engine 100, an MG signal MGS with respect to the motor/generator 111, a power control instruction PCI with respect to the power control means 115, and a malfunction indicator lamp signal MILS with respect to the malfunction indicating means 102. The idle-stop signal IDS and the MG signal MGS are output from the idle-stop control means 130, and the power control instruction PCI is output from the power control instruction means 133. The malfunction indicator lamp signal MILS is output from the malfunction determination means 134.

The starter 101 receives the starter signal STS from the engine controller 120, and performs an initial starting of the engine 100. The starting of the engine 100 by means of the starter signal STS is referred to as the initial starting. The initial starting is performed, for example, when the vehicle starts from a starting point of the vehicle. The starter 101 is supplied with electric power from the vehicle-mounted battery 116, and initially starts the engine 100 on the basis of an engine starting manipulation by an operator, for example, a starting manipulation by means of a key switch. The starter 101 is normally separated from the engine 100, but is coupled with the engine 100 when the engine controller 120 generates the starter signal STS by performing the starting manipulation by means of the key switch to initially start the engine 100.

The engine 100 receives the idle-stop signal IDS from the idle-stop control means 130. The idle-stop signal IDS is changed between an ON level and an OFF level. When the idle-stop signal IDS becomes the ON level, the engine 100 is controlled to the idle-stop state. When the idle-stop signal IDS becomes the OFF level, the idle-stop state is released. The engine 100 is controlled to the idle-stop state when the vehicle is temporarily stopped, and the engine 100 is re-started by the motor/generator 111 if the idle-stop state is released. The re-starting represents the starting of the engine 100 after the idle-stop state is released.

The motor/generator 111 is configured by an alternating current rotating machine. The motor/generator 111 is directly coupled to the engine 100 and is normally coupled to the engine 100. The motor/generator 111 receives the MG signal MGS from the idle-stop control means 130 and is controlled by the MG signal MGS. The MG signal MGS is changed among three levels of a power running level, a power generation level, and a standby level. When the MG signal MGS becomes the power running level, the motor/generator 111 is operated as a motor, and supplies a driving power to the engine 100. When the MG signal MGS becomes the power generation level, the engine 100 is controlled to self-running state, and the motor/generator 111 is driven by the engine 100 and is operated as a generator so as to generate electric energy. The self-running state of the engine 100 represents a state where the engine 100 independently rotates without receiving the driving power from the motor/generator 111. Since the motor/generator 111 is an alternating current rotating machine, the electric energy generated by the motor/generator 111 is an alternating current power. When the MG signal MGS becomes the standby level, the motor/generator 111 is in a standby state, does not function as the motor and the generator, and stops when the engine 100 stops.

The power converter 112 is connected between the motor/generator 111 and the power capacitor 113, and performs a bi-directional power conversion between them. The power converter 112 converts an alternating current power from the motor/generator 111 into a direct current power when the motor/generator 111 is operated as the generator, and charges the power capacitor 113 by the direct current power. When the motor/generator 111 is operated as the motor, the power converter 112 converts the direct current power accumulated in the power capacitor 113 into the alternating current power so as to supply the converted power to the motor/generator 111. When the motor/generator 111 is in the standby state, the power converter 112 also stops the power converting operation.

As the power capacitor 113, for example, a power capacitor having a rated voltage of 24[V] is used. The motor/generator 111 operates together with the power capacitor 113, and is capable of charging the power capacitor 113 up to a voltage value exceeding the rated voltage 24[V] when the motor/generator 111 is operated as the generator. Further, when the motor/generator 111 is operated as the motor, the motor/generator 111 is supplied with electric power from the power capacitor 113, and is capable of re-starting the engine 100. The capacitor sensor 114 is connected to the power capacitor 113. The capacitor sensor 114 detects a terminal voltage of the power capacitor 113 and outputs a capacitor voltage CAV indicating the terminal voltage of the power capacitor 113.

As the vehicle-mounted battery 116, for example, a battery of a 12[V] series is used. The vehicle-mounted battery 116 supplies electric power to the starter 101 and also supplies electric power to the vehicle-mounted electric load 118. The electric load 118 includes a variety of lamps, an air conditioner, and a variety of driving motors for a power window and so on. The battery sensor 117 is connected to the vehicle-mounted battery 116. The battery sensor 117 detects a battery charged electricity quantity of the vehicle-mounted battery 116 and outputs a state of charge "SOC". The battery charged electricity quantity is generally referred to as the state of charge "SOC", and is a value in which a charging rate of the vehicle-mounted battery 116 is represented as a percentage.

The power control means 115 is connected between the power capacitor 113 and the vehicle-mounted battery 116. The power control means 115 has a basic function and an auxiliary function. The basic function is a function for controlling ON and OFF of the transfer of the electric energy to the vehicle-mounted battery 116 from the power converter 112 and the power capacitor 113. The auxiliary function is a function for decreasing a direct current voltage of a direct current power output from the power converter 112 and a voltage of the power capacitor 113 and for charging the vehicle-mounted battery 116, when the power control means 115 transfers the electric energy from the power converter 112 and the power capacitor 113 to the vehicle-mounted battery 116. In the first embodiment, the rated voltage of the power capacitor 113 is 24[V], but the vehicle-mounted battery 116 is 12[V]. Considering that the voltage values are different from each other, the auxiliary function is added. Specifically, the power control means 115 decreases the direct current voltage output from the power converter 112 and the voltage of the power capacitor 113, outputs approximately a constant direct current voltage of 13.5[V], and charges the vehicle-mounted battery 116 at the time of the operation.

The power control means 115 is constructed by using a DC/DC converter by way of example, and receives the power control instruction PCI from the power control instruction means 133 of the engine controller 120. The power control instruction PCI is changed between a driving level and a stop level. The power control means or DC/DC converter 115 is driven when the power control instruction PCI becomes the driving level, and decreases the direct current voltage output from the power converter 112 and the direct current voltage of the power capacitor 113 to charge the vehicle-mounted battery 116. Further, when the power control instruction PCI becomes the stop level, the power control means or DC/DC converter 115 stops the operation and stops the transfer of the electric energy from the power capacitor 113 to the vehicle-mounted battery 116. Further, in the first embodiment, the power control means or DC/DC converter 115 is constructed as a unidirectional power control means, and specifically, is constructed to control the unidirectional transfer of the electric energy which is directed to the vehicle-mounted battery 116 from the power capacitor 113, but this is not limited thereto. The power control means or DC/DC converter 115 may be constructed as a bi-directional power control means, and can perform the power control in the direction in which the electric energy is directed to the power capacitor 113 from the vehicle-mounted battery 116, as well as in the direction in which the electric energy is directed to the vehicle-mounted battery 116 from the power capacitor 113. In a case where the power control means or DC/DC converter 115 is constructed as the bi-directional power control means, and is constructed to increase, for example, the voltage of about 12[V] up to a direct current voltage of about 24[V] to be supplied to the power capacitor 113 in the direction in which the electric energy is directed to the power capacitor 113 from the vehicle-mounted battery 116.

To the idle-stop determination means 131 are input a vehicle speed signal VHS indicating the speed of the vehicle, an engine rotation number signal ERS indicating the rotation speed of the engine 100, a brake signal BRS indicating a brake state with respect to the vehicle, and an idle-stop release command IDSC. The vehicle speed signal VHS, the engine rotation number signal ERS and the brake signal BRS are supplied from the outside of the engine controller 120. The idle-stop release command IDSC is supplied from the power state determination means 132. The idle-stop determination means 131 outputs an idle-stop flag IDSF on the basis of the vehicle speed signal VHS, the engine rotation number signal ERS and the brake signal BRS. The idle-stop control means 130 outputs the idle-stop signal IDS on the basis of the idle-stop flag IDSF. The idle-stop signal IDS is obtained by simply amplifying the idle-stop flag IDSF, and thus, changes thereof become the same. The idle-stop flag IDSF is also supplied to the power state determination means 132.

The idle-stop flag IDSF, the capacitor voltage CAV and the state of charge SOC are supplied to the power state determination means 132. The idle-stop flag IDSF is supplied from the idle-stop determination means 131, the capacitor voltage CAV is supplied from the capacitor sensor 114, and the state of charge SOC is supplied from the battery sensor 117, respectively. The power state determination means 132 outputs a power control instruction flag PCIF, an idle-stop release instruction IDSC on the basis of the idle-stop flag IDSF, the capacitor voltage CAV, and the state of charge SOC. The power control instruction flag PCIF is supplied to the power control instruction means 133, and the idle-stop release command IDSC is supplied to the idle-stop determination means 131. The power control instruction means 133 outputs a power control instruction PCI on the basis of the power control instruction flag PCIF. The power control instruction PCI is obtained by simply amplifying the power control instructing flag PCIF, and thus, changes thereof become the same.

The malfunction indicating means 102 is connected to the malfunction determination means 134 of the engine controller 120, and notifies an operator of a variety of malfunctions. The malfunction determination means 134 determines a variety of malfunctions with reference to the engine controller 120. According to the present invention, the malfunction determination means 134 generates a malfunction indicator lamp signal MILS in a case where the engine 100 does not re-start, and then supplies the signal to the malfunction indicating means 102. The malfunction indicating means 102 includes a variety of malfunction indicator lamps. The malfunction indicating means 102 receives the malfunction indicator lamp signal MILS to turn on the indicator lamps, and thus, notifies the operator of the malfunction in which the re-starting of the engine 100 is not performed.

Further, an accelerator signal ACS corresponding to a depress state of an accelerator pedal of a vehicle is supplied to the engine controller 120.

(2) Control Operation of the Idle-Stop According to the First Embodiment

FIGS. 2A to 2F are timing charts illustrating the behaviors of a variety of elements of a vehicle with respect to an idle-stop control operation according to a temporary stop of the vehicle according to the first embodiment. The idle-stop control operation according to the temporary stop of the vehicle according to the first embodiment will be described with reference to FIGS. 2A to 2F. FIG. 2A illustrates an idle-stop signal IDS and an idle-stop flag IDSF, FIG. 2B illustrates an accelerator signal ACS, FIG. 2C illustrates a brake signal BRS, FIG. 2D illustrates an MG signal MGS, FIG. 2E illustrates an engine rotation number signal ERS, and FIG. 2F illustrates a vehicle speed signal VHS, respectively.

As shown in FIG. 2A, the idle-stop signal IDS and the idle stop flag IDSF are changed between an ON level and an OFF level. The idle-stop signal IDS and the idle stop flag IDSF become the ON level in a case where the idle-stop instruction is applied to the engine 100 from the idle-stop control means 130, and become the OFF level in a case where the idle-stop is released. As shown in FIG. 2B, the accelerator signal ACS is changed between an ON level and an OFF level, and becomes the ON level in a state where the accelerator pedal of the vehicle is depressed and becomes the OFF level in a state where the accelerator pedal of the vehicle is not depressed. As shown in FIG. 2C, the brake signal BRS is changed between an ON level and an OFF level, and becomes the ON level in the state where the brake pedal of the vehicle is depressed and becomes the OFF level in the state where the brake pedal is not depressed.

As shown in FIG. 2D, the MG signal is changed among three levels of a power running level, a power generation level, and a standby level. If the MG signal MGS becomes the power running level, the motor/generator 111 is operated as the motor and gives the driving power to the engine 100 so as to re-start the engine 100. If the MG signal MGS becomes the power generation level, the motor/generator 111 is operated as the generator and is driven by the engine 100. If the MG signal MGS becomes the standby level, the motor/generator 111 is in the standby state. The engine rotation number signal ERS is expressed in a unit [rpm] in the motor in FIG. 2E, and is represented as an idling rotation number $\alpha 1$ [rpm] and an engine starting completion determination rotation number $\alpha 2$ [rpm]. The vehicle speed signal VHS is expressed in a unit [km/h] in FIG. 2F.

The horizontal axis in FIGS. 2A to 2F represents a common time axis t. Along the horizontal axis, points of time t1 to t8 are plotted. Before a point of time t1, a normal driving state of the vehicle is illustrated. In the normal driving state, the vehicle is driven by the engine 100. The engine 100 is operated in a fuel-cut state in a period between the point of time t1 and a point of time t2, the engine 100 is operated in an idling state in a period between the point of time t2 and a point of time t3, the engine 100 is in an idle-stop state in a period between the point of time t3 and a point of time t5, the engine 100 is in a re-starting state in a period between the point of time t5 and a point of time t6, the engine 100 is operated in the idling state again in a period between the point of time t6 and a point of time t7, and the engine 100 is in the normal running state again in a period between the point of time t7 and a point of time t8.

At the point of time t1, as the accelerator pedal is released from the depression, the accelerator signal ACS is changed into the OFF level from the ON level. Also, as a brake pedal is depressed, the brake signal BRS is changed into the ON level from the OFF level. In the period between the point of time t1 and the point of time t2, since the accelerator signal ACS becomes the OFF level and the brake signal BRS becomes the ON level, the engine rotation number signal ERS and the vehicle speed signal VHS are decreased. According to the deceleration, in the period between the point of time t1 and the point of time t2, the engine 100 is operated in the fuel-cut state, and the engine rotation number signal ERS is decreased to the idling rotation number $\alpha 1$ [rpm]. In the period between the point of time t2 and the point of time t3, the fuel-cut state with respect to the engine 100 is released, and the engine 100 maintains the idling rotation number $\alpha 1$ [rpm] for operation and becomes the idling state. Further, in the period between the point of time t2 and the point of time t3, since the engine rotation number ERS maintains the idling rotation number $\alpha 1$ [rpm], the MG signal MGS becomes the power generation level, and the motor/generator 111 maintains the power generation state and charges the power capacitor 113 through the power converter 112.

At the point of time t3, since the brake signal BRS maintains the ON level, the engine rotation number signal ERS maintains the idling rotation number al, and the vehicle speed signal VHS maintains 0 [km/h] at a predetermined time, the idle-stop control means 130 sets the idle-stop signal IDS and the idle-stop flag IDSF at the ON level, and thus, the engine 100 is in the idle-stop state. In the period between the point of time t3 and the point of time t5, since the brake signal BRS maintains the ON level and the vehicle speed signal VHS maintains 0 [km/h], the idle-stop signal IDS and the idle-stop flag IDSF are maintained at the ON level, and the engine 100 maintains the idle-stop state. In the idle-stop state, the MG signal MGS becomes the standby level, and the motor/generator 111 becomes the standby state, and thus, the engine rotation number signal ERS becomes 0 [rpm].

At the point of time t5, as the brake signal BRS becomes the OFF level, the idle-stop control means 130 sets the idle-stop signal IDS and the idle-stop flag IDSF at the OFF level, and thus, the idle-stop state of the engine 100 is released. Further, at the point of time t5, as the brake signal BRS becomes the OFF level, the idle-stop control means 130 sets the MG signal MGS in the power running level, so as to control the motor/generator 111 in the power running state. As the motor/generator 111 is in the power running state, the motor/generator 111 is supplied with electric power through the power converter 112 from the power capacitor 113, and is operated as the motor to re-start the engine 100. In the period between the point of time t5 and the point of time t6, since the motor/generator 111 maintains the power running state, the engine 100 is cranked until the engine rotation number signal ERS reaches the engine starting completion determination rotation number $\alpha 2$ [rpm].

In the period between the point of time t6 and the point of time t7, the engine rotation number signal ERS is converged into the idling rotation number $\alpha 1$ [rpm], and the engine 100 becomes the idling state. In the period between the point of time t7 and the point of time t8, the operator depresses the accelerator pedal to change the accelerator signal ACS into the ON level, and thus, the vehicle starts the normal running state. Further, according to the depressing amount of the accelerator pedal, the engine rotation number signal ERS is increased, and the vehicle speed signal VHS is also increased.

(3) Flowchart for Controlling the Electric Energy According to the First Embodiment FIG. 3 is a flowchart illustrating an electric power control operation before and after the idle-stop state according to the first embodiment. The electric power control operation in the idle-stop state according to the first embodiment will be described with reference to FIG. 3. Further, the flowchart shown in FIG. 3 is repeatedly performed with a very short cycle in a unit of micro seconds.

The vehicle speed signal VHS, the engine rotation number signal ERS, the brake signal BRS, the capacitor voltage CAV, and the state of charge SOC are input to the idle-stop control means 130, and steps S301 to S310 in FIG. 3 are performed.

Firstly, in step S301, the idle-stop determination means 131 judges the operation condition of the vehicle on the basis of the vehicle speed signal VHS, the brake signal BRS, and the engine rotation number signal ERS, and determines whether or not to give the idle-stop instruction. In the idle-stop determination means 131, if any one of the following three conditions (a), (b) and (c) is satisfied, it is determined that the idle-stop condition is not satisfied:

(a) a case where the vehicle speed signal VHS exceeds a stop determination speed of the vehicle, that is, 0 [km/h],
(b) a case where the engine rotation number signal ERS exceeds the idling rotation number α1 [rpm], and
(c) a case where the brake signal BRS is the OFF level.

If the determination result of step S301 is "Yes", that is, in a case where the idle-stop determination means 131 determines that the idle-stop condition is not satisfied, the procedure goes to "END", to then complete the electric power control routine at the time of the idle-stop.

In a case where the determination result of step S301 is "No", that is, the idle-stop determination means 131 determines that the all conditions (a), (b) and (c) are not achieved, in other words, in a case where the vehicle speed signal VHS is 0 [km/h], the engine rotation number signal ERS is equal to or smaller than the idling rotation number α1 [rpm], and the brake signal BRS is at the ON level, it is determined that the vehicle is stopped, and then the procedure goes to step S302. In step S302, the idle-stop is performed. In step S302, the idle-stop signal IDS and the idle-stop flag IDSF become the ON level, and the engine 100 becomes the idle-stop state.

In step S303 after step S302, the idle-stop determination means 131 sets the idle-stop flag IDSF at the ON level in step S302, and thus, the power state determination means 132 sets the power control instruction flag PCIF at the stop level. As the power control instruction flag PCIF becomes the stop level, the power control instruction means 133 sets the power control instruction PCI at the stop level. As the power control instruction PCI becomes the stop level, the power control means or DC/DC converter 115 stops the operation. As a result, the transfer of the electric energy from the power capacitor 113 to the vehicle-mounted battery 116 is stopped.

Next, in step S304, the electric power state determination means 132 determines whether or not the state of charge SOC is equal to or larger than a predetermined value β[%]. If the state of charge SOC is equal to or larger than the predetermined value β[%] and the determination result of step S304 is "Yes", the procedure goes to "END", to then terminate the electric power control routine at the time of the idle-stop. Further, if the determination result of step S304 is "No", the procedure goes to step S305.

The power control means or DC/DC converter 115 stops its operation by step S303 when the idle-stop control means 130 idle-stops the engine 100. However, as step S303 leads to step S304, and in step S304, when the state of charge SOC is equal to or larger than the predetermined value β[%], the operation is stopped.

The predetermined value β[%] with respect to the state of charge SOC has hysteresis characteristics, and becomes either an upper predetermined value β1[%] or a lower predetermined value β2[%]. The upper predetermined value β1[%] is set as a value in which the vehicle-mounted battery 116 can supply electric power to the electric load 118, in the idle-stop state of a short time in consideration of the temporary stop of the vehicle. The lower predetermined value β2[%] is set as a value in which there is a risk that the battery goes dead in the vehicle-mounted battery 116 if the state of charge SOC becomes equal to or smaller than β2[%]. With respect to the setting of the predetermined value β[%], when the electric power is supplied from the vehicle-mounted battery 116 to the electric load 118, β2[%] is set as the predetermined value β[%]. Further, when the state of charge SOC is equal to or smaller than the β2[%] and the vehicle-mounted battery 116 is required to be charged, β1[%] is set as the predetermined value β[%].

In step S305, the power state determination means 132 determines whether or not the capacitor voltage CAV is equal to or larger than a predetermined value γ[V]. The predetermined value γ[V] is an allowance voltage value obtained by adding the allowance voltage of 3[V] to 4[V] to a voltage value γ0[V] required for securing the re-starting performance of the engine 100 by the motor/generator 111. The voltage value γ0[V] required for securing the re-starting performance of the engine 100 is, for example, 12[V] to 14[V] in the first embodiment, and the predetermined value γ[V] is set to a voltage value obtained by adding the allowance voltage value of 3[V] to 4[V] to this voltage value γ0[V]. If the determination result of step S305 is "Yes", the procedure goes to S306, whereas if the determination result of step S305 is "No", the procedure goes to step S307.

Step S306 is performed when the capacitor voltage CAV is equal to or larger than the predetermined value γ[V]. In step S306, the power state determination means 132 sets the power control instruction flag PCIF at the driving level. As the electric control instruction flag PCIF becomes the driving level, the power control instruction means 133 sets the power control instruction PCI at the driving level. As the power control instruction PCI becomes the driving level, the power control means or DC/DC converter control means 115 is driven, and the vehicle-mounted battery 116 is charged through the power control means or DC/DC converter control means 115 from the power capacitor 113.

Step S306 is performed when the capacitor voltage CAV is equal to or larger than the predetermined value γ [V]. In step S306, the power state determination means 132 sets the power control instruction flag PCIF at the driving level. As the electric control instruction flag PCIF becomes the driving level, the power control instruction means 133 sets the power control instruction PCI at the driving level. As the power control instruction PCI becomes the driving level, the power control means or DC/DC converter 115 is driven, and the vehicle-mounted battery 116 is charged through the power control means or DC/DC converter 115 from the power capacitor 113.

Next, in step S308 after step S307, the idle-stop control means 130 determines whether or not the re-starting of the engine 100 is completed. In this determination, the engine rotation number signal ERS is used. Here, it is determined whether or not the engine rotation number signal ERS becomes equal to or larger than the engine starting completion determination rotation number α2 [rpm] of the engine 100 or not. If the determination result of step S308 is "Yes", it is determined that the re-starting of the engine 100 is completed, and then, the procedure goes to step S309, whereas if the determination result of step S308 is "No", it is determined that the re-starting of the engine 100 is not completed, and then, the procedure goes to step S310.

In step S309, the engine controller 120 sets a target power generation voltage of the motor/generator 111 to be higher than a target voltage in a normal power generation. For example, the engine controller 120 sets the target power generation voltage to about 28.0[V], and thus, the motor/generator 111 performs the power generation at the increased target power generation voltage.

In step S310, it is determined that the idle-stop state is released but the engine 100 is not re-started, and thus, the malfunction determination means 134 sets the malfunction indicator lamp signal MILS at the ON level to then turn on the malfunction indicating means 102 by the malfunction indicator lamp signal MILS and to notify the operator of the malfunction.

(4) First Electric Power Control Operation According to the First Embodiment FIGS. 4A to 4H are timing charts illustrating the behaviors of a variety of elements of the vehicle with respect to a first electric power control operation before and after the idle-stop state according to the first embodiment. In the first electric power control operation, after the temporary stop of the vehicle, as the brake signal BRS is at the OFF level, the idle-stop state is released, and then, the engine 100 is re-started by the motor/generator 111.

FIG. 4A illustrates an idle-stop signal IDS and an idle-stop flag IDSF, FIG. 4B illustrates an accelerator signal ACS, FIG. 4C illustrates a brake signal BRS, FIG. 4D illustrates an MG signal MGS, FIG. 4E illustrates an engine rotation number signal ERS, FIG. 4F illustrates a vehicle speed signal VHS, FIG. 4G illustrates a capacitor voltage CAV, and FIG. 4H illustrates a power control instruction PCI and a power control instruction flag PCIF, respectively.

FIGS. 4A to 4H more specifically illustrate behaviors of a variety of elements of the vehicle in the period between the point of time t2 and the point of time t7 in FIGS. 2A to 2F, including the behavior of the capacitor voltage CAV, the power control instruction PCI and the power control instruction flag PCIF. The horizontal axis in FIGS. 4A to 4H is a common time axis t, and the period between the point of time t2 and the point of time t7 in FIGS. 2A to 2F is enlarged compared with that in FIGS. 2A to 2F. Further, in the idling period between the point of time t6 and the point of time t7, a point of time t61 is newly plotted.

Changes in the idle-stop signal IDS, the idle-stop flag IDSF, the accelerator signal ACS, the brake signal BRS, the MG signal MGS, the engine rotation number signal ERS, and the vehicle speed signal VHS shown in FIGS. 4A to 4F are the same as in FIGS. 2A to 2F, respectively, but are enlarged in the period between the point of time t2 and the point of time t7. The capacitor voltage CAV in FIG. 4G and the power control instruction PCI and the power control instruction flag PCIF in FIG. 4H are newly added thereto. Further, the behaviors of the variety of elements of the vehicle according to the first embodiment is illustrated by solid lines in FIGS. 4A to 4H. The behavior respectively of the MG signal MGS indicated by a dotted line in FIG. 4D, the engine rotation number signal ERS indicated by a dotted line in FIG. 4E, the capacitor voltage CAV indicated by a dotted line in FIG. 4G, and the power control instruction PCI and the power control instruction flag PCIF indicated by a dotted line in FIG. 4H are behaviors in a comparative example compared with the first embodiment.

The capacitor voltage CAV in FIG. 4G is a constant value which is equal to or larger than the predetermined value γ[V] until the point of time t5, and then is decreased as the motor/generator 111 is operated as the motor and the re-starting of the engine 100 is started at the point of time t5. The capacitor voltage CAV is decreased as electric power is supplied to the motor/generator 111 which is operated as the motor from the power capacitor 113, in the re-starting of the engine 100. However, if the re-starting of the engine 100 is completed at the point of time t6, since the MG signal MGS becomes the power generation level, the motor/generator 111 is operated as the generator. As a result, since the generated electric energy charges the power capacitor 113 through the power converter 112, the capacitor voltage CAV is increased from the point of time t6.

The power control instruction PCI and the power control instruction flag PCIF shown in FIG. 4H maintains the driving level until the point of time t3. In this period, the power control means or DC/DC converter 115 maintains the driving state, and the charging is performed to the vehicle-mounted battery 116 from the power converter 112 and the power capacitor 113 through the power control means or DC/DC converter 115. According to the starting of the idle-stop state at the point of time t3, the power control instruction PCI and the power control instruction flag PCIF become the stop level, the power control means or DC/DC converter 115 becomes the stop state in the period between the point of time t3 and the point of time t5, and thus, the transfer of the electric energy between the power capacitor 113 and the vehicle-mounted battery 116 is cut off.

At the point of time t5, if the brake signal BRS becomes OFF, the determination result of step S301 becomes "Yes". Here, in the idle-stop control means 130, the power control instruction PCI and the power control instruction flag PCIF become the driving level, and at the same time, the MG signal MGS becomes the power running level. As a result, the motor/generator 111 is operated as the motor, and the re-starting of the engine 100 is started. After starting the re-starting of the engine 100 at the point of time t5, the power control instruction PCI and the power control instruction flag PCIF become the driving level until the point of time t7, and the power control means or DC/DC converter 115 becomes the operation state. In the period between the point of time t5 and the point of time t6, the electric energy is transferred from the power capacitor 113 to the vehicle-mounted battery 116, and in the period between the point of time t6 and the point of time t7, the power capacitor 113 is charged through the power converter 112 from the motor/generator 111 operated as the generator, and the vehicle-mounted battery 116 is charged.

In the idle-stop period between the point of time t3 and the point of time t5, the determination result of step S301 in FIG. 3 becomes "No". Then, in step S302, the idle-stop control means 130 performs the idle-stop by setting the idle-stop signal IDS and the idle-stop flag IDSF at the ON level, and thus, the engine rotation number signal ERS becomes 0 [rpm]. In the first embodiment, in the period, since the idle-stop control means 130 sets the power control instruction PCI and the power control instruction flag PCIF at the stop level in step S303 and the power control means or the DC/DC converter 115 stops the transfer of the electric energy, the capacitor voltage CAV maintains a constant value. In the idle-stop period between the point of time t3 and the point of time t5, the vehicle-mounted battery 116 supplies the electric power to the electric load 118.

On the other hand, as indicated by the dotted line in FIG. 4H, in the comparative example in which the power control instruction PCI and the power control instruction flag PCIF maintain the driving level in the period between the point of time t3 and the point of time t5, since the power control means or DC/DC converter 115 operates in the idle-stop period between the point of time t3 and the point of time t5, the electric energy is transferred to the vehicle-mounted battery 116 from the power capacitor 113. Thus, in this comparative example, in the idle-stop period between the point of time t3 and the point of time t5, as indicated by the dotted line in FIG. 4G, the capacitor voltage CAV is decreased. As the capacitor voltage CAV is decreased in the idle-stop period between the point of time t3 and the point of time t5, even though the motor/generator 111 starts the re-starting of the engine 100 at the point of time t5, a starting torque becomes decreased. Thus, as indicated by the dotted line in FIG. 4E, an increasing speed of the engine rotation number signal ERS is decreased, and a point of time when the engine rotation number signal ERS reaches the engine starting completion determination rotation number α2 is delayed until t61. In this comparative example, as indicated by the dotted line in FIG. 4D, the re-starting of the engine 100 continues until the point of time t61, and as a result, the capacitor voltage CAV is decreased until the point of time t61.

In this way, in the first electric power control operation according to the first embodiment, since the capacitor voltage CAV can be maintained to stop the power control means or DC/DC converter 115 in the idle-stop period, in the re-starting of the engine 100, the electric power can be stably supplied to the motor/generator 111.

Figure 5:
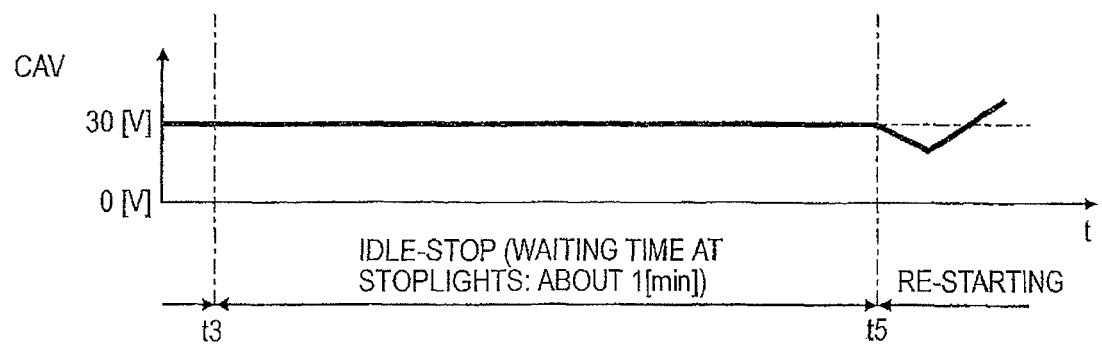
FIG. 5 is a diagram illustrating a voltage characteristic of a power capacitor in a non-load state.

FIG. 5 is a diagram illustrating a result obtained by experimentally confirming the behavior of the capacitor voltage CAV in the idle-stop period between the point of time t3 and the point of time t5 according to the first embodiment. In FIG. 5, the idle-stop period between the point of time t3 and the point of time t5 is set to one minute corresponding to the waiting time of the vehicle at stoplights. In the first embodiment, in the idle-stop period, the power control means or DC/DC converter 115 stops the operation, and thus, the transfer of the electric energy from the power capacitor 113 to the vehicle-mounted battery 116 is stopped. Further, as shown in FIG. 5, it has been found that the capacitor voltage CAV maintains the constant value, without the voltage decrease due to the self-discharging in the power capacitor 113.

(5) Second Electric Power Control Operation According to the First Embodiment

FIGS. 6A to 6H are timing charts illustrating the behaviors of a variety of elements of the vehicle with respect to a second electric power control operation before and after the idle-stop state according to the first embodiment. In the second electric power control operation, in the period when the temporary stop of the vehicle is maintained, in a case where the capacitor voltage CAV is equal to or larger than the predetermined value γ[V], when the state of charge SOC is decreased, the power control means or DC/DC converter 115 is driven without releasing the idle-stop state to thereby charge the vehicle-mounted battery 116 from the power capacitor 113.

The second electric power control operation according to the first embodiment will be described with reference to FIGS. 6A to 6H. In FIGS. 6A to 6H, compared with FIGS. 4A to 4H, the behavior of the accelerator signal ACS in FIG. 4B is deleted, and instead, the behavior of the state of charge SOC is added in FIG. 6F.

Figure 6:
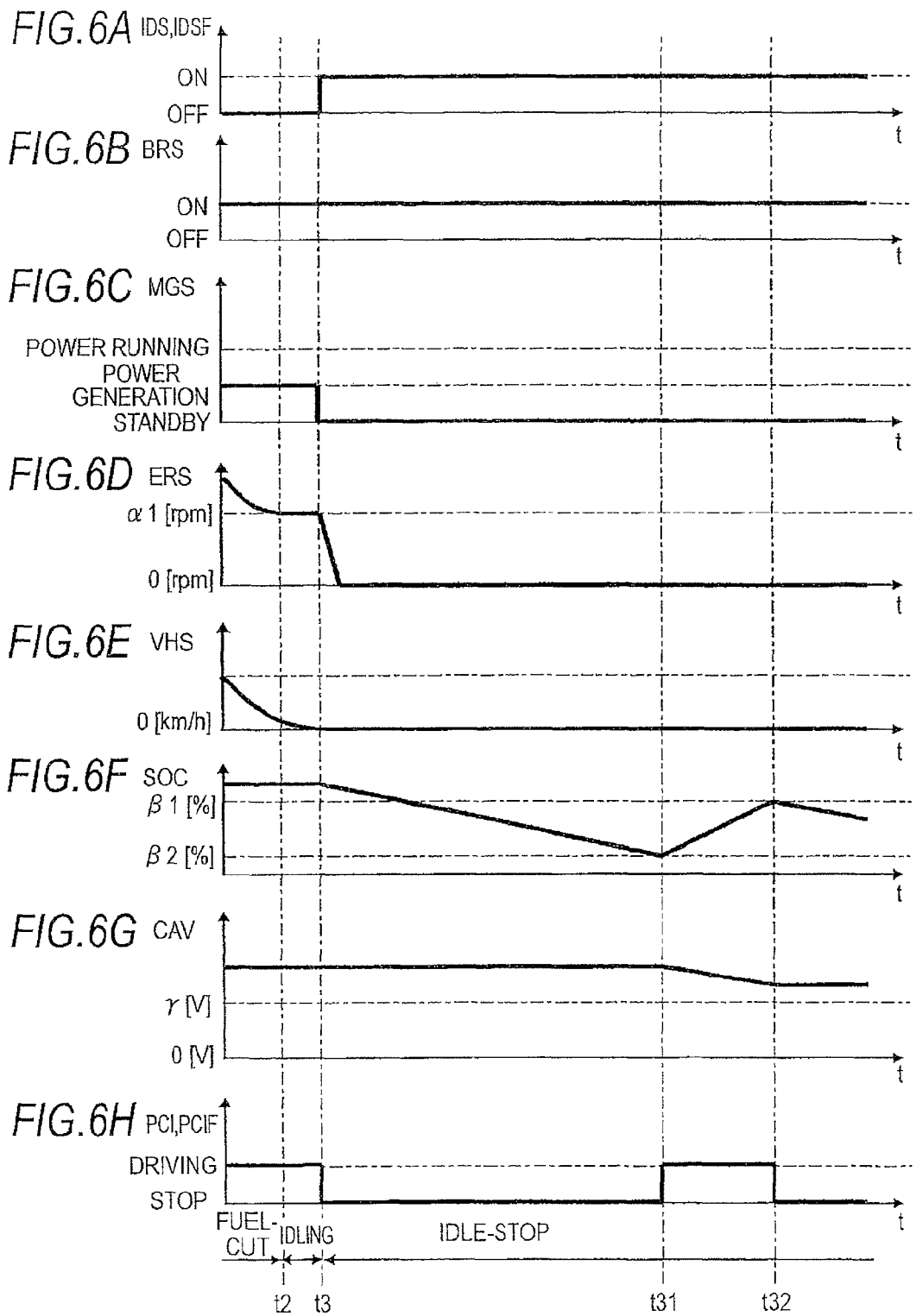
FIGS. 6A to 6H are timing charts illustrating the behaviors of a variety of elements of the vehicle with respect to a second electric power control operation before and after the idle-stop state according to the first embodiment.

FIG. 6A illustrates an idle-stop signal IDS and an idle-stop flag IDSF, FIG. 6B illustrates a brake signal BRS, FIG. 6C illustrates a MG signal MGS, FIG. 6D illustrates an engine rotation number signal ERS, FIG. 6E illustrates a vehicle speed signal VHS, FIG. 6F illustrates a state of charge SOC, FIG. 6G illustrates the capacitor voltage CAV, and FIG. 6H illustrates a power control instruction PCI and a power control instruction flag PCIF, respectively. The horizontal axis in FIGS. 6A to 6H represents a common time axis t. In the horizontal axis in FIGS. 6A to 6H, in addition to the points of time t2 and t3, points of time t31 and t32 are plotted. The points of time t2 and t3 are the same as in FIGS. 4A to 4H. The points of time t31 and t32 are points of time plotted in the idle-stop period between the points of time t3 and t5 in FIGS. 4A to 4H.

The engine rotation number signal ERS in FIG. 6D is indicated with the idling rotation number α1 [rpm]. The state of charge SOC in FIG. 6F is indicated with the upper predetermined value β1 [%] and the lower predetermined value β2 [%]. If the state of charge SOC is disposed between the upper predetermined value β1 [%] and the lower predetermined value β2 [%], in the idle-stop state according to the temporary stop of the vehicle, the vehicle-mounted battery 116 can supply the electric power to the electric load 118, and if the state of charge SOC is equal to or smaller than the lower predetermined value β2 [%], there is a risk that the battery goes dead in the vehicle-mounted battery 116. The capacitor voltage CAV in FIG. 6G is indicated with the predetermined value γ [V]. If the capacitor voltage CAV is equal to or larger than the predetermined value γ [V], the motor/generator 111 is operated as the motor to be able to re-start the engine 100.

The brake signal BRS is maintained at the ON level in the entire period shown in FIGS. 6A to 6H, and in particular, after the point of time t3, even after the point of time t31, the vehicle speed signal VHS becomes 0 [km/h], the temporary stop of the vehicle is maintained. The capacitor voltage CAV is a voltage value higher than the predetermined value γ[V], and may be a voltage value which is equal to or larger than the predetermined value γ[V] in the entire period shown in FIGS. 6A to 6H.

In FIGS. 6A to 6H, in the period until the point of time t3, since the motor/generator 111 is operated as the generator, the power capacitor 113 is charged through the power converter 112, and the power control means or DC/DC converter 115 is also operated, the vehicle-mounted battery 116 is also charged through the power converter 112.

After the point of time t3, the vehicle speed signal VHS becomes 0 [km/h], and the vehicle maintains the temporary stop state. Further, even after the point of time t3, the brake signal BRS maintains the ON level. After the point of time t3, the idle-stop signal IDS and the idle-stop flag IDSF become the ON level, and the engine 100 maintains the idle-stop state. The idle-stop period after the point of time t3 continues until the point of time t5 in a similar way to FIGS. 4A to 4H. In the idle-stop state, the MG signal MGS becomes the standby level, and thus, the motor/generator 111 maintains the standby state. In a period between the point of time t3 and the point of time t31, since the power control instruction PCI and the power control instruction flag PCIF become the stop level, the power control means or DC/DC converter 115 stops the operation, and thus, the transfer of the electric energy from the power capacitor 113 to the vehicle-mounted battery 116 is stopped. However, since the electric power is supplied from the vehicle-mounted battery 116 to the electric load 118 in the period between the point of time t3 and the point of time t31, the state of charge SOC is gradually decreased. In this state, the state of charge SOC in step S304 in FIG. 3 is set to the lower predetermined value $\beta2[\%]$.

At the point of time t31 when the state of charge SOC is decreased to a value lower than the lower predetermined value $\beta2[\%]$, the determination result of step S304 in FIG. 3 becomes "No". Then, after it is determined that the capacitor voltage CAV is equal to or larger than the predetermined value $\gamma[V]$ in step S305 in FIG. 3, in step S306, the power control instruction PCI and the power control instruction flag PCIF become the driving level, and the power control means or DC/DC converter 115 is driven. Thus, the vehicle-mounted battery 116 is charged through the power control means or DC/DC converter 115 from the power capacitor 113, and the state of charge SOC is gradually increased after the point of time t31. In this state, the predetermined value $\beta[\%]$ of the state of charge SOC in step S304 in FIG. 3 is set to the upper predetermined value $\beta1[\%]$.

At the point of time t32 when the state of charge SOC is increased to the upper predetermined value $\beta1[\%]$ or above, the determination result of step S304 in FIG. 3 becomes "Yes", and in step S303, the power control instruction PCI and the power control instruction flag PCIF become the stop level, and thus, the power control means or DC/DC converter 115 stops the operation. As the power control means or DC/DC converter 115 stops the operation, the charging from the power capacitor 113 to the vehicle-mounted battery 116 is stopped.

In this way, in the second electric power control operation shown in FIGS. 6A to 6H, in a case where the capacitor voltage CAV is higher than the predetermined value $\gamma[V]$ in the period when the temporary stop of the vehicle continues, when the state of charge SOC is decreased without releasing the idle-stop state, in a state where the motor/generator 111 maintains the standby state without releasing the idle-stop state, the electric energy is transferred from the power capacitor 113 to the vehicle-mounted battery 116, and thus, fuel consumption can be reduced, the battery going dead of the vehicle-mounted battery 116 can be prevented, and also the electric energy can be stably supplied to the electric power load 118.

(6) Third Electric Power Control Operation According to the First Embodiment

Next, FIGS. 7A to 7I are timing charts illustrating the behaviors of a variety of elements of the vehicle with respect to a third electric power control operation before and after the idle-stop state according to the first embodiment. In the third electric power control operation, in the period when the temporary stop of the vehicle is maintained, in a case where the capacitor voltage CAV is decreased to be smaller than the predetermined value $\gamma[V]$, after the idle-stop state is released according to the decrease in the state of charge SOC and the engine 100 is re-started by the motor/generator 111, the power control means or DC/DC converter 115 is driven, and the vehicle-mounted battery 116 is charged from the motor/generator 111 and the power capacitor 113.

The third electric power control operation will be described with reference to FIGS. 7A to 7I. The third electric power control operation is different from the second electric power control operation shown in FIGS. 6A to 6H in that in the period when the temporary stop of the vehicle is maintained, the idle-stop state is released, and thereafter, a control of the re-starting of the engine 100 and a control operation of the power control means or DC/DC converter 115 according to this control are performed.

Figure 7:
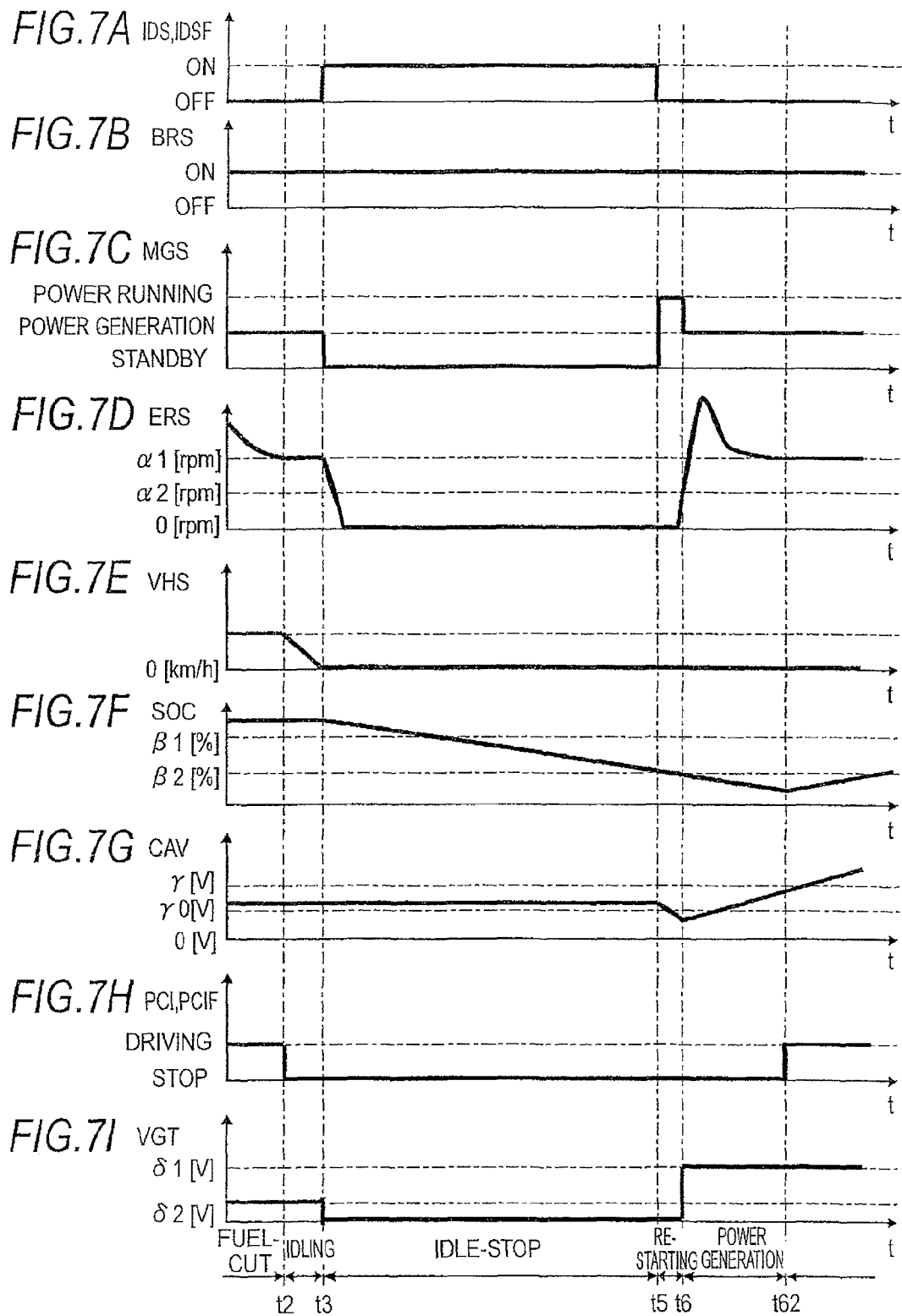
FIGS. 7A to 7I are timing charts illustrating the behaviors of a variety of elements of the vehicle with respect to a third electric power control operation before and after the idle-stop state according to the first embodiment.

FIG. 7A illustrates an idle-stop signal IDS and an idle-stop flag IDSF, FIG. 7B illustrates a brake signal BRS, FIG. 7C illustrates an MG signal MGS, FIG. 7D illustrates an engine rotation number signal ERS, FIG. 7E illustrates a vehicle speed signal VHS, FIG. 7F illustrates a state of charge SOC, FIG. 7G illustrates a capacitor voltage CAV, FIG. 7H illustrates a power control instruction PCI and a power control instruction flag PCIF, and FIG. 7I illustrates a target power generation voltage instruction value VGT, respectively. FIGS. 7A to 7H illustrate the behaviors of the same elements as in FIGS. 6A to 6H, but the target power generation voltage instruction value VGT is added in FIG. 7I. The horizontal axis in FIGS. 7A to 7I is the common time axis t, along which points of time t2, t3, t5, t6, and t62 are plotted. The points of time t2, t3, t5, and t6 are the same as in FIGS. 4A to 4H. The point of time t62 is plotted between the points of time t6 and t7 in FIGS. 4A to 4H.

The engine rotation number signal ERS in FIG. 7D is indicated with the idling rotation number $\alpha1$ [rpm] and the engine starting completion determination rotation number $\alpha2$ [rpm]. The state of charge SOC in FIG. 7F is indicated with the upper predetermined value $\beta1$ [%] and the lower predetermined value $\beta2$ [%]. If the state of charge SOC is equal to or larger than the lower predetermined value $\beta2$ [%], in the idle-stop state according to the temporary stop of the vehicle, the vehicle-mounted battery 116 can supply the electric power to the electric load 118, and if the state of charge SOC is smaller than the lower predetermined value $\beta2$ [%], there is a risk that the battery goes dead in the vehicle-mounted battery 116. The capacitor voltage CAV in FIG. 7G is indicated with the predetermined value $\gamma$ [V] and the voltage value $\gamma0[V]$ required for securing the starting performance of the motor/generator 111. If the capacitor voltage CAV becomes a value smaller than the voltage value $\gamma0[V]$, the motor/generator 111 is operated as the motor, and thus, there is a risk that the engine 100 cannot be re-started. The target power generation voltage instruction value VGT in FIG. 7I is an instruction value for instructing the target power generation voltage in a case where the motor/generator 111 is operated as the generator. The target power generation voltage instruction value VGT is illustrated with predetermined values $\delta1[V]$ and $\delta2[V]$. The predetermined value $\delta2[V]$ is an instruction value of the target power generation voltage VGT in the idling state where the engine 100 rotates at the idling rotation number $\alpha1$ [rpm], and is generally set to about 24.0[V]. When the motor/generator 111 is operated as the generator, if the power generation voltage is equal to or larger than the predetermined value $\delta2[V]$, the vehicle-mounted battery 116 is charged, and the electric power can be supplied to the electric load 118. The predetermined value $\delta1[V]$ is a target power generation voltage instruction value which is higher than the predetermined value $\delta2[V]$, for example, 28.0[V].

The brake signal BRS becomes the ON level in the entire periods shown in FIGS. 7A to 7I, and in particular, after the point of time t3, even after the point of time t5, the vehicle speed signal VHS becomes 0 [km/h], and the temporary stop of the vehicle continues. The capacitor voltage CAV is smaller than the predetermined value $\gamma[V]$ in the period until the point of time t5, and specifically becomes an intermediate value between the predetermined value $\gamma[V]$ and the voltage value $\gamma0[V]$.

Until the point of time t3, the target power generation voltage instruction value VGT is set to the predetermined value δ2[V], the motor/generator 111 is operated as the generator, and the power capacitor 113 is charged through the power converter 112. Further, since the power control means or DC/DC converter 115 is operated, the vehicle-mounted battery 116 is charged through the power converter 112.

In the idle-stop period between the points of time t3 and t5, the idle-stop condition is satisfied, and thus, the determination result of step S301 in FIG. 3 becomes the "No", the idle-stop signal IDS and the idle-stop flag IDSF become the ON level in step S302, and the engine rotation number signal ERS becomes 0 [rpm], so that the idle-stop state is maintained. Since the electric load 118 consumes electric power in the idle-stop period, the state of charge SOC is gradually decreased. In the idle-stop period, the predetermined value β[%] of the state of charge SOC in step S304 is set to the lower predetermined value β2[%], and in the idle-stop period, the determination result of step S304 in FIG. 3 becomes "Yes". If the state of charge SOC is decreased to a value which is smaller than the lower predetermined value β2[%] at the point of time t5, the determination result of step S304 in FIG. 3 becomes "No", and the procedure goes to step S305. In step S305, since the capacitor voltage CAV is smaller than the predetermined value γ[V], the determination result in step S305 becomes "No", and the procedure goes to step S307. In step S307, the idle-stop control means 130 sets the idle-stop signal IDS and the idle-stop flag IDSF at the OFF level so as to release the idle-stop state, and sets the MG signal MGS at the power running level so as to drive the motor/generator 111 as the motor, and thus, the re-starting of the engine 100 is started.

In FIGS. 7A to 7I, since the capacitor voltage CAV in the idle-stop period is decreased to a value which is smaller than the predetermined value γ[V], it is necessary to charge the power capacitor 113. Thus, at the point of time t5, the idle-stop signal IDS and the idle-stop flag IDSF become the OFF level, and the MG signal MGS becomes the power running level. As a result, the motor/generator 111 is operated as the motor, and the electric power starts to be supplied to the motor/generator 111 from the power capacitor 113, and the re-starting of the engine 100 is performed. The capacitor voltage CAV is further decreased to supply the electric power to the motor/generator 111. The decrease in the capacitor voltage CAV continues until the point of time t6.

At the point of time t6, since the engine rotation number signal ERS reaches the engine starting completion determination rotation number α2 [rpm], the MG signal MGS becomes the power generation level, and the motor/generator 111 is operated as the generator to generate the power generation output, and the engine rotation number signal ERS is converged into the idling rotation number α1 [rpm], and then is stabilized. At the point of time t6, the target power generation voltage instruction value VGT is set to the predetermined value δ1[V], to thereby increase the state of charge SOC and the capacitor voltage CAV. If the target power generation voltage instruction value VGT is set to the predetermined value δ1[V], the charging with respect to the power capacitor 113 is facilitated.

At the point of time t62, since the capacitor voltage CAV becomes equal to or larger than the predetermined value γ[V], the determination result of step S305 in FIG. 3 becomes "Yes", the power control instruction PCI and the power control instruction flag PCIF become the ON level in step S306, and the power control means or the DC/DC converter 115 starts the operation, and thus, the vehicle-mounted battery 116 is charged from the power converter 112 and the power capacitor 113.

In this way, in the third electric power control operation, in the period when the temporary stop of the vehicle is maintained, in a case where the capacitor voltage CAV is decreased to the voltage value which is smaller than the predetermined value γ[V], when the state of charge SOC is decreased, the idle-stop state is released, and the engine 100 is re-started to perform the power generation. However, as the target power generation voltage instruction value VGT is set to be higher than the normal power generation, the electric energy of the power capacitor 113 and the vehicle-mounted battery 116 can be increased at an early stage.

(7) Malfunction Indicating Operation According to the First Embodiment

Figure 8:
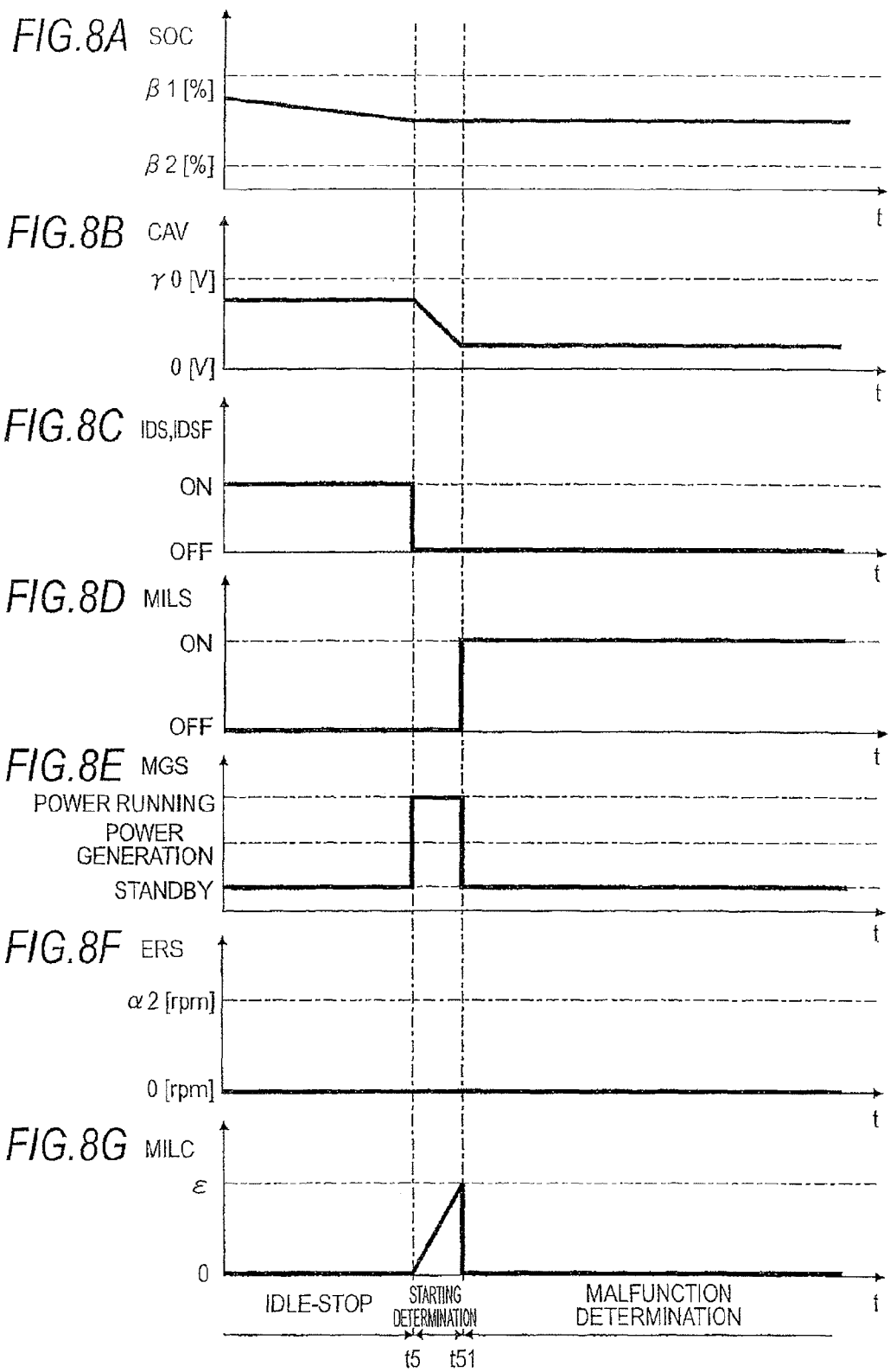
FIGS. 8A to 8G are timing charts illustrating the behaviors of a variety of elements of the vehicle with respect to a control operation at the time of malfunction indication according to the first embodiment.

FIGS. 8A to 8G are timing charts illustrating a control operation of a variety of elements at the time of malfunction indication according to the first embodiment. FIG. 8A illustrates a state of charge SOC, FIG. 8B illustrates a capacitor voltage CAV, FIG. 8C illustrates an idle-stop signal IDS and an idle-stop flag IDSF, FIG. 8D illustrates a malfunction indicator lamp signal MILS output from the malfunction determination means 134, FIG. 8E illustrates an MG signal MGS, FIG. 8F illustrates an engine rotation number signal ERS, and FIG. 8G illustrates a malfunction counter value MILC, respectively.

The state of charge SOC in FIG. 8A is indicated with the upper predetermined value β1[%] and the lower predetermined value β2[%]. The capacitor voltage CAV in FIG. 8B is indicated with the voltage value γ0[V]. If the capacitor voltage CAV is smaller than the voltage value γ0[V], there is a risk that the engine 100 cannot be re-started by the motor/generator 111. The malfunction indicator lamp signal MILS in FIG. 8D is output from the malfunction determination means 134 of the engine controller 120 in FIG. 1, and is changed between the ON level and the OFF level. The engine rotation number signal ERS in FIG. 8F is indicated with the engine starting completion determination rotation number α2[rpm]. The malfunction counter value MILC in FIG. 8G is a counter value of a malfunction counter included in the malfunction determination means 134, and is indicated with a predetermined value ε.

The horizontal axis in FIGS. 8A to 8G is a common time axis t. Along the time axis t, points of time t5 and t51 are plotted. The point of time t5 is the same as in the point of time t5 in FIGS. 7A to 7I. After a predetermined time from the point of time t5, the point of time t51 is plotted.

When the motor/generator 111 is operated as the motor to re-start the engine 100, the malfunction indicator lamp signal MILS becomes the ON level in a case where the engine 100 has not been started so as to turn on the malfunction indicating means 102, and in a case where the engine 100 has been started, the malfunction indicator lamp signal MILS maintains the OFF level so as not to turn on the malfunction indicating means 102. In the period until the malfunction counter value MILC reaches the predetermined value ε, from the point of time t5 when the MG signal MGS becomes the power running level, if the engine rotation number signal ERS reaches the engine starting completion determination rotation number α2 [rpm], the malfunction determination means 134 determines that the engine 100 is started, and sets the malfunction indicator lamp signal MILS at the OFF level. Further, if the engine rotation number signal ERS does not reach the engine starting completion determination rotation number α2 [rpm] during that period, the malfunction determination means 134 determines that the engine 100 is not started, and sets the malfunction indicator lamp signal MILS at the ON level. Further, the predetermined value ϵ is set to a value reached after one second from the start of the counting of the malfunction counter value MILC, and after the determination of the engine starting state, the counter value is cleared.

At the point of time t5, since the state of charge SOC is equal to or smaller than the upper predetermined value β1[%], the capacitor voltage CAV is smaller than the voltage value γ0[V], the idle-stop is released by the idle-stop control means 130. Further, due to the release of the idle-stop, the MG signal MGS is set to the power running level, and the motor/generator 111 is operated as the motor. In the period between the time t5 and the t51, in the re-starting of the engine 100, at the point of time t51 when the malfunction counter value MILC reaches the predetermined value ϵ, if the engine rotation number signal ERS is smaller than the engine starting completion determination rotation number α2[rpm], it is determined that the re-starting of the engine 100 fails. At the point of time t51, if it is determined that the re-starting of the engine 100 fails, the malfunction determination means 134 sets the malfunction indicator lamp signal MILS at the ON level to turn on the malfunction indicating means 102.

In the malfunction indicating operation shown in FIGS. 8A to 8G as described above, since the malfunction indicating means 102 is turned on when the re-starting of the engine 100 fails, the causes of the starting troubles can be determined, and thus, necessary measures can be rapidly taken.

Second Embodiment

Figure 9:
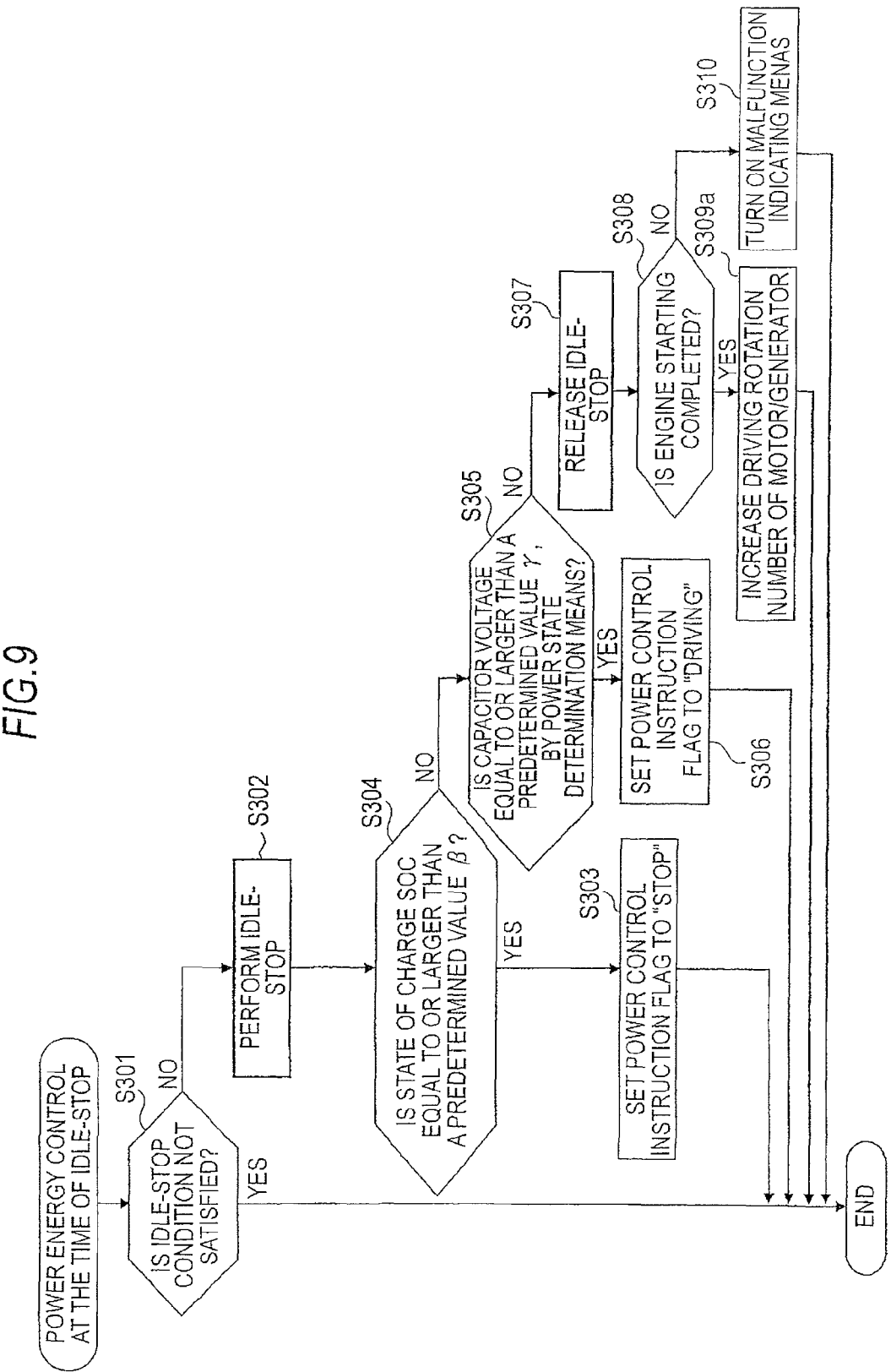
FIG. 9 is a flowchart illustrating an electric power control operation before and after an idle-stop state in an electric power controller for a vehicle with stop-start system according to a second embodiment of the present invention.

FIG. 9 is a flowchart illustrating an electric power control operation in an electric power controller for a vehicle with stop-start system according to a second embodiment of the present invention. In the second embodiment, compared with the first embodiment, the flowchart illustrating the electric power control in FIG. 3 is changed into the flowchart shown in FIG. 9. The second embodiment is configured in the same way as in the first embodiment, other than this point.

In the flowchart shown in FIG. 9, compared with the flowchart in FIG. 3, step S303 is performed after the determination result of step S304 becomes "Yes", and step S309 is changed into step S309a. Further, in the second embodiment, the power control means or DC/DC converter 115 stops the operation in step S303 when the idle-stop control means 130 idle-stops the engine 100, but since step S303 is performed when the determination result of step S304 becomes "Yes", the operation is stopped when the state of charge SOC becomes equal to or larger than the predetermined value β[%] in step S304.

In the second embodiment, step S303 is performed after the determination result of step S304 becomes "Yes", but the first electric power control operation described with reference to FIGS. 4A to 4H, the second electric power control operation described with reference to FIGS. 6A to 6H, the third electric power control operation described with reference to FIGS. 7A to 7I, and the control operation in the malfunction indication described with reference to FIGS. 8A to 8G are performed in a similar way to the first embodiment, in the second embodiment.

Here, in the second embodiment, the step S309 is changed into step S309a. In the third electric power control operation, the motor/generator 111 is operated as the generator in step S309a. As the engine rotation speed after completion of the starting of the engine 100 is set to a rotation speed which is higher than the normal power generation level, the rotation speed of the motor/generator 111 is increased. For example, the engine rotation speed after completion of the starting of the engine 100 is increased by 100 [rpm], compared with the idling rotation number al.

In the third electric power control operation according to the second embodiment, as the engine rotation speed after completion of the starting of the engine 100 is increased, the rotation speed of the motor/generator 111 is increased, and the electric energy of the power capacitor 113 and the vehicle-mounted battery 116 can be increased at an early stage. Further, it is possible to obtain the effects similar to the case where the target power generation voltage VGT is increased according to the first embodiment.

The electric power controller for the vehicle with stop-start system according to the present invention can be applied to a variety of vehicles which employs the idle-stop control.

Various modifications and alternations of this invention will be apparent to those skilled in the art without departing from the scope and sprits of this invention, and it should be understood that this is not limited to the illustrative embodiments set forth herein.

What is claimed is:

1. An electric power controller for a vehicle with stop-start system in which an engine is controlled to an idle-stop state according to an operation condition of the vehicle and to a re-starting state after the idle-stop state, the electric power controller comprising:
    a motor/generator which is configured to drive the engine at the re-starting state of the engine and is driven by the engine at a self-running state after the engine has been re-started to generate electric energy;
    a power capacitor which is configured to be charged with the electric energy generated by the motor/generator and supplies the electric energy to the motor/generator at the re-starting state of the engine;
    power controller comprising a DC/DC converter, the power controller being connected between a vehicle-mounted battery for supplying electric power to an electric load and the power capacitor, the power controller performing control so that the vehicle-mounted battery is charged with the electric energy accumulated in the power capacitor;
    a microcomputer comprising an idle-stop controller which controls the engine in the idle-stop state;
    battery sensor for measuring a capacitor voltage of the power capacitor; and
    a capacitor sensor for measuring a capacity voltage of the power capacitor,
    wherein the power controller is configured to perform control in the idle-stop state so that the transfer of the electric energy from the power capacitor to the vehicle-mounted battery is stopped in a case where the state of charge of the vehicle-mounted battery is equal to or greater than a first predetermined value and the capacitor voltage of the power capacitor is equal to or greater than a second predetermined value, and the transfer of the electric energy from the power capacitor to the vehicle-mounted battery is executed when the state of charge of the vehicle-mounted battery has dropped to a smaller value than the first predetermined value in a state where the capacitor voltage of the power capacitor is equal to or greater than the second predetermined value.

2. The electric power controller for the vehicle with the stop-start system according to claim 1, wherein the idle-stop controller is configured to release the idle-stop state to re-start the engine when the state of charge of the vehicle-mounted battery has dropped to the smaller value than the first predetermined value in a state where the capacitor voltage of the power capacitor is smaller than the second predetermined value in the idle-stop state, and the motor/generator is configured to generate the electric energy which charges the power capacitor.

3. The electric power controller for the vehicle with the stop-start system according to claim 2, wherein when the idle-stop state is released by the idle-stop controller, at least one from among a control for increasing a target power generation voltage of the motor/generator and a control for increasing a rotation number of the engine after completion of starting of the engine is executed.

4. The electric power controller for the vehicle with the stop-start system according to claim 3, wherein the microcomputer further comprises a malfunction determiner which is configured to control malfunction indicating means, wherein when the idle-stop state is released by the idle-stop controller, and when the malfunction determiner determines that the engine does not re-start on the basis of an engine rotation number signal, the malfunction indicating means is operated by the malfunction determiner.

* * * * *